Patented July 28, 1953

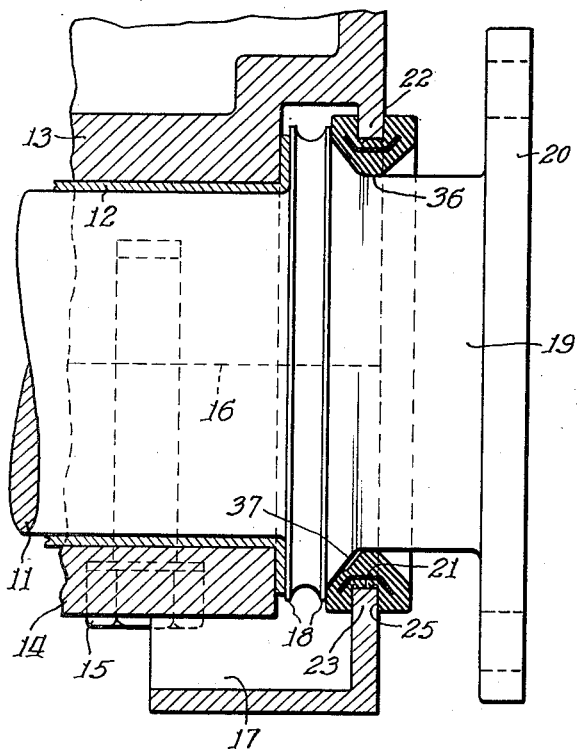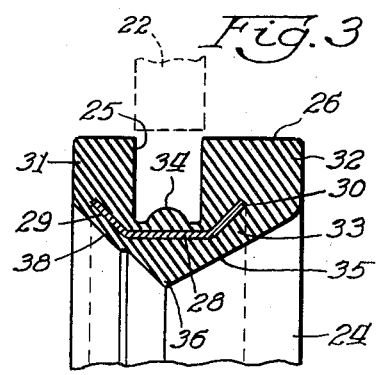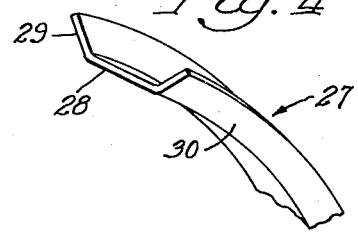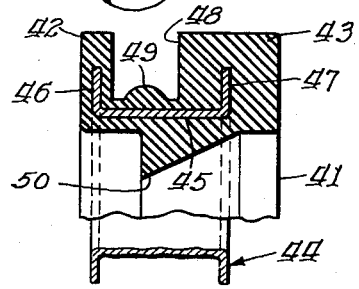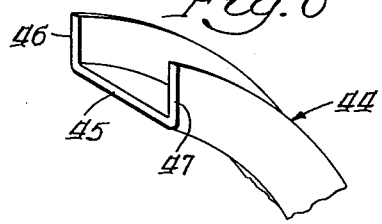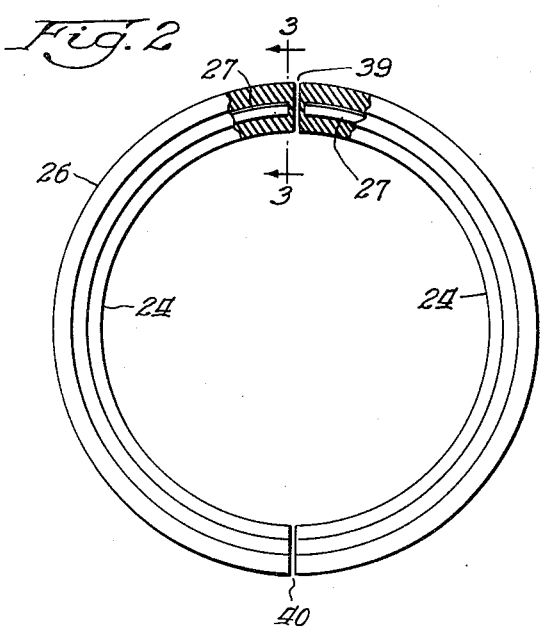

2,647,002

UNITED STATES PATENT OFFICE 2,647,002

OIL SEAL MEANS OR THE LIKE

Olin Brummer, Chicago Heights, Ill.

Application July 20, 1950, Serial No. 174,932

2 Claims. (Cl. 288—2)

This invention relates to oil seal means or the like, more particularly for sealing oil or other lubricant against leakage around a rotating shaft, as, for example, the main bearing for the crank shaft of an internal combustion engine.

An important object of the present invention is the simplification and improvement of a two-part annular seal of the class referred to, the effectiveness of the seal and its ease and security of application being enhanced without the necessity of using screws, bolts or other fastening means or extraneous springs.

This invention is of particular utility for use with relatively rotatable elements, one of which elements has an annular flange extending toward the other element and the space between which is desired to be sealed.

A further object of the present invention is the provision of a two-part seal having a metallic skeleton which is rigid to resist torsional stresses while having a body of resilient rubber-like material in which the skeleton is embedded, the body material being limitedly yieldable to enhance the sealing effect.

These and other objects and advantages will be apparent from the following description, taken together with the accompanying drawings, of illustrative embodiments of the invention, and in which drawings—

Figure 1 is a sectional view of pertinent parts of a motor block or similar housing and means of the present invention applied thereto and to the motor crank shaft;

Figure 2 is an end view of a complete seal device following the present invention, separated from the remainder of the structure of Fig. 1, and looking at the seal device from the left-hand end of the structure as seen in Fig. 1;

Figure 3 is an enlarged cross-section taken on line 3—3 of Fig. 2, and indicating in broken lines other parts with which the seal means is subsequently assembled;

Figure 4 is a fragmentary perspective view of the metal skeleton shown in Figs. 1 to 3 inclusive;

Figure 5 is a view somewhat similar to Fig. 3 but showing a modification; and

Figure 6 is a fragmentary perspective view of the metallic skeleton shown in Fig. 5.

Referring in detail to the illustrative constructions shown in the drawings, the numeral 11 may indicate the crank shaft of an internal combustion engine or motor which is journaled as by a bearing sleeve element 12 in the mating semi-cylindrical sections 13 and 14 of the engine block, these sections being suitably secured together by the usual machine bolts, one of which is indicated at 15. The motor block bearing may be split on the line 16 and may include an oil chamber 17 within which may rotate the oil throw flanges 18 that are integral with the crank shaft 11 and beyond which the crank shaft may be extended as at 19, projecting from the engine block and conventionally enlarged as at 20 for having secured thereto the customary fly wheel which need not be here shown. The opening 21 is commonly margined by the mating halves 22 and 23 of the motor block housing flange. It is the opening 21, through which the crank shaft projects, that is desired to be sealed against the leakage of oil therethrough and along the shaft, and to which accomplishment the seal means of the present invention is directed.

In accordance with the present invention, and turning first to Figs. 1 to 4 inclusive, the seal means includes an arcuate body 24 of desirably rubber-like material, for example, one of the resilient synthetic elastomers, which may be readily molded under the influence of heat and pressure to the desired form and which will withstand heat, cold and the action of light, lubricants and chemicals without appreciable deterioration.

The body 24, as here shown, is arcuately in the form of a semi-circle, and is best seen in Fig. 2, two such bodies 24 are abutted, ends to ends, to provide a complete circle making up an operative annular sealing means.

The body 24 is adapted to interlock with the marginal flange portion 22 or 23, as the case may be, of the motor block, there being one of the bodies 24 for each said marginal portion, and for this purpose the body has an arcuate groove 25 opening into the axially extending face 26 of the body. This groove 25 extends arcuately of the body and opens peripherally and radially therefrom. The body is of sufficient thickness radially so that the motor block flange 22 or 23, as the case may be, is received to a substantial extent therein to provide a secure interlocking effect and an anchor for the body on the flange in sealing position, as later described.

Further in accordance with the present invention, the groove 25 is initially, as the body is molded, slightly narrower than the thickness of the flange 22 or 23, as best seen in Fig. 3, and the body is forced onto the flange, in this figure the flange 22, against the expansive resilience of the body material, the body being expansible transversely to widen the groove 25 by reason of the U-shape cross-section effected by the shape of the body and the groove therein and the natural elasticity of the material thereof, but limited as later pointed out.

Still further in accordance with the present invention, the body is reinforced arcuately and desirably on both sides of the groove 25 by a substantially rigid metal insert or skeleton 27 embedded in the body, during the molding step in this instance. The insert 27 is advantageously of channel-like form having an axially extending portion or floor 28 and two outwardly flaring side walls 29 and 30. It will be noted that the side walls 29 and 30 receive the grooved portion of the body therebetween, that is, the side wall 29 extends well into the body portion 31 on one side of the groove, and the side wall 30 well into the body portion 32 on the other side of the groove, the floor 28 of the skeleton being disposed axially in the connecting body part 33. The body at the bottom of the groove 25 may have an integral hump or camber 34 for purposes presently pointed out.

The skeleton insert 27 being substantially rigid, preferably, rather than springy, prevents bending of the body in a radial direction and compensates for torsional stresses created by the revolutions and torque of the crank shaft 11 in contact with the body, as later referred to. At the same time and while preventing excessive deformation of the body, sufficient expansion thereof is permitted, within the limits of the skeleton insert, to permit the groove 25 to be widened sufficiently to receive the motor block flange by a force fit, whereby the body thereafter hugs the flange by its inherent resilience reinforced by the skeleton insert 27.

The body 24 is formed as to have a radially directed taper, in this instance centripetally directed, as at 35, and providing a sealing lip 36 which bears resiliently against the crank shaft extension 19 when the seal means is inserted in position as shown in Fig. 1. The sealing lip, which in the complete sealing means is annular, rides in close frictional contact on the rotating shaft portion 19 of the crank shaft 11, thus effectively closing the opening 21 against egress of oil.

As here shown, the body 24 also rides in rotative frictional contact with the inclined surface 37 of the crank shaft which joins the extension 19 and one of the oil throw flanges 18. Desirably the body has a bearing surface 38 which rides on this incline to effect a further seal, since oil which is thrown by the oil throw flanges 18 to be circulated into the bearing 12, is diverted back into the oil chamber 17 and is prevented from passing out of the engine block through the opening 21, thus also minimizing the work of the sealing lip 36 in sealing this opening.

It will be noted that the sealing lip 36 is advantageously radially aligned with the groove 25 and with the hump 34 at the bottom of the groove, thus enhancing the sealing effect both at the lip and at the hump, which latter tends to be compressed against its inherent resilience for this purpose.

To accommodate the limited space between the crank shaft tapered face 37 and the motor block flanges 22—23, the body side 31 may be somewhat narrower than the body side 32. Here again the skeleton insert channel wall 29 cooperates to reinforce the body portion 31 even though narrower.

Desirably the metallic skeleton 27 terminates short of the ends of the body 24 so that a rubber-to-rubber contact of the body ends is provided at 39 and 40, at diametrically opposite sides of the complete annulus shown in Fig. 2 when the two semi-circular bodies are brought together upon closing and bolting of the motor block mating sections as previously referred to, each skeleton being substantially a semi-circle.

The modification shown in Figs. 5 and 6 may be employed for example when the space between the crank shaft inclined surface 37 and the motor block flanges is still more limited. Here, the body 41 has a relatively quite narrow side 42 and a relatively quite wide side 43, and the metal skeleton insert 44 is in the form of a right angular channel having an axially extending portion or floor 45 and right-angular radially extending side walls 46 and 47, one of which, in this instance 46, extends well up into the relatively narrow body side 42, while the other extends into the relatively wide body side 43, otherwise as and for the purpose previously referred to with respect to the metal skeleton insert 27.

As seen in Fig. 5, the body 41 has a corresponding peripheral groove 48 humped or cambered at its bottom as at 49, and also has a sealing lip 50, all having a similar function and for a similar purpose as already referred to in connection with the other figures of the drawings. The sealing lip 50 is of somewhat sharper cross-section than the lip 36, providing somewhat more flexibility.

Under the influence of hot oil in the crank case, some swelling of the body material is present after installation and use of the seal. The present invention contributes to controlling such swelling so that the interlock between the flange of the motor housing and the groove in the body becomes more secure.

It is not intended to be understood that the invention is limited to all the details of construction here shown for purposes of exemplification, or to the two specific forms here described, and it is to be understood that such changes may be made as fall within the scope of the appended claims without departing therefrom.

The invention having been described, what is here claimed is:

1. In oil seal means or the like, an arcuate body of elastomeric material having a peripheral outwardly radially opening groove therein with side body portions margining the groove, and a substantially rigid arcuate metallic insert embedded in said body, said insert being of channel-shape in cross-section having one portion extending axially of a center about which the body is arced and having side walls extending outwardly from the axially extending portion, a side wall extending into each side portion of said body at the sides of said groove respectively, said body having an integral arcuate sealing lip extending generally radially inwardly thereof, said insert extending substantially across the juncture between said lip and the remainder of the body portion and separating the sealing lip from the groove and there being elastomeric material of the body between the axially extending portion and said groove and between the insert and the sealing lip.

2. The structure of claim 1 in which there is a hump at the bottom of the groove of the body following the arc thereof and the axially extending portion of the metallic insert separates the sealing lip from the groove and hump.

OLIN BRUMMER.

References Cited in the file of this patent

UNITED STATES PATENTS

| Number | Name | Date |
|---|---|---|
| 2,209,578 | Rainey et al. | July 30, 1940 |
| 2,480,116 | Brummer | Aug. 30, 1949 |

FOREIGN PATENTS

| Number | Country | Date |
|---|---|---|
| 478,136 | Great Britain | of 1938 |
| 544,732 | Great Britain | of 1942 |